United States Patent [19]

Groebke

[11] Patent Number: 4,730,191

[45] Date of Patent: Mar. 8, 1988

[54] RADAR SIMULATION

[75] Inventor: Harald Groebke, Salem, Fed. Rep. of Germany

[73] Assignee: Dornier System GmbH, Friedrichshafen, Fed. Rep. of Germany

[21] Appl. No.: 709,511

[22] Filed: Mar. 8, 1985

[30] Foreign Application Priority Data

Mar. 8, 1984 [DE] Fed. Rep. of Germany ....... 3408404

[51] Int. Cl.$^4$ ............................................... G01S 7/40
[52] U.S. Cl. ........................................ 342/169; 434/2
[58] Field of Search ........................... 343/17.7; 434/2; 342/169, 165, 171

[56] References Cited

U.S. PATENT DOCUMENTS

| | | | |
|---|---|---|---|
| 3,731,309 | 5/1973 | Meyer et al. | 343/17.7 |
| 4,005,424 | 1/1977 | Fetter | 343/17.7 |
| 4,560,987 | 12/1985 | Dochow et al. | 434/2 |

Primary Examiner—Thomas H. Tarcza
Assistant Examiner—Donald E. Hayes, Jr.
Attorney, Agent, or Firm—Ralf H. Siegemund

[57] ABSTRACT

A method for computer aided simulation of complete radar systems under evaluation of the instantaneous power and frequency information comprises the steps of providing a simulation signal representing the instantaneous power spectrum of the transmitter modifying said signal in accordance with the propagation and spreading path to be simulated and in addition modifying said signal in accordance with preselected target properties, modifying the previously modified signal in accordance with particular properties characteristic of the receiver and associated components to be simulated, such as amplifier characteristics, filters, mixers, Doppler stages, analog-to-digital conversion and calculating statistical moments of the first and second order of the resulting signal such as the expectancy value and its variance and indicating the same.

6 Claims, 1 Drawing Figure

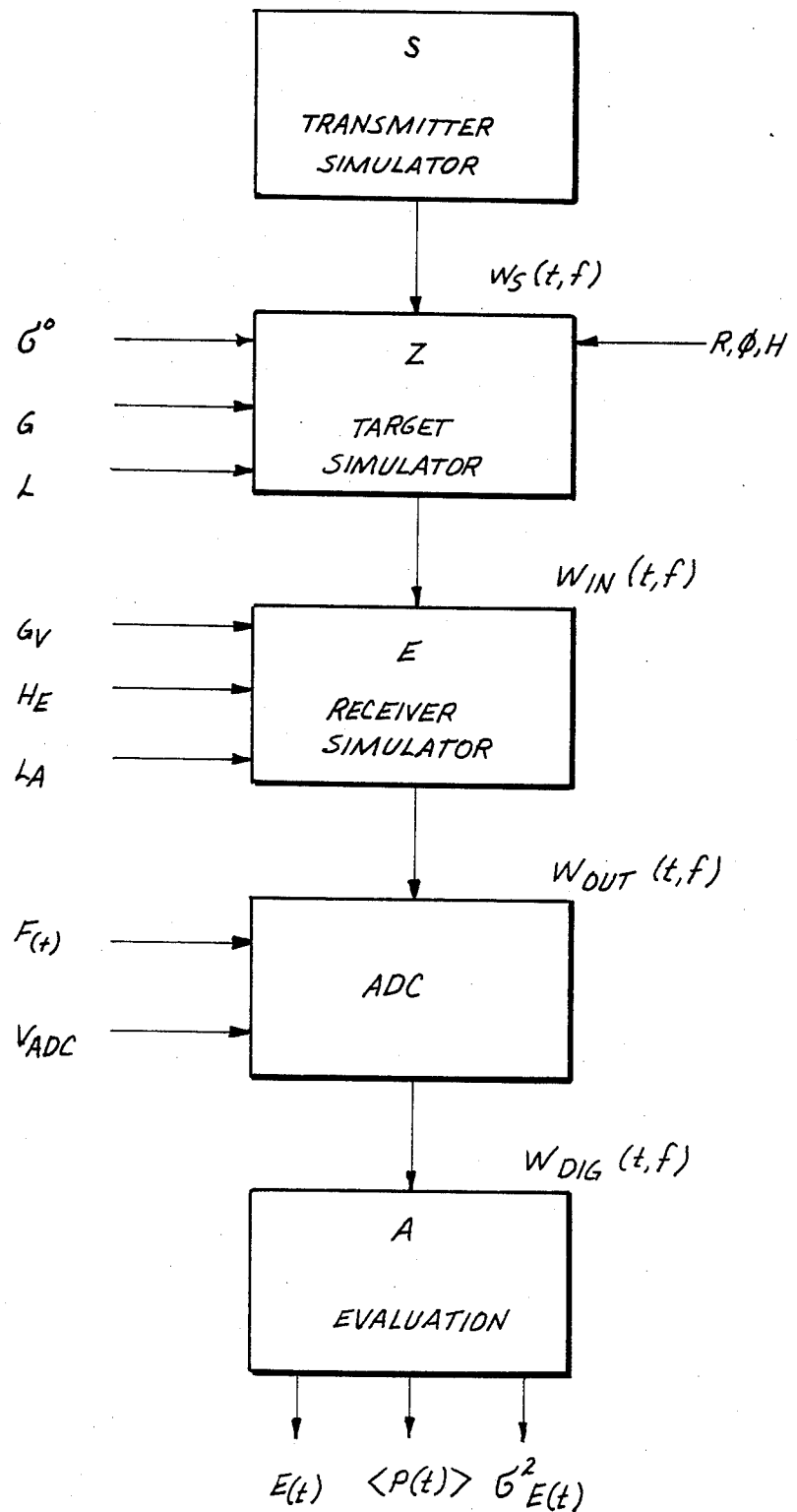

RADAR SIMULATION

BACKGROUND OF THE INVENTION

The present invention relates to computer-aided simulation of complete radar system for evaluating the instantaneous power information as well as relevant frequency information thereof.

Simulation methods generally employ certain models according to which certain aspects in the "real world" are reproduced, i.e., simulated, and tested in accordance with the simulation model. Specifically, in the case of radar systems, simulation involves testing how a radar pulse is modified during propagation and dispersion; during refraction at a target; upon being received in the antenna; and pursuant to further processing in the receiver equipment. The result of said simulation is then used for optimizing signal processing.

The method of simulation is particularly suited in case of radar systems which link special, significant changes in amplitude and/or certain details in the frequency information with a particular characteristic, or a set of characteristics, of the target. This is, for example, employed in case of radar altitude meters, for example, for a satellite or a satellite supported piece of equipment. Another field of interest is measuring the wind speed through ascertaining a section of the back scatter of ocean waves. This being very special tasks, it is to be noted, however, that a simulation method of a general nature should be in principle usable for all different kinds of radar systems, in which, for example, some form of power measurement is conducted.

Let dp(t) be the power reflected by an aerial element dA being spaced at a distance R from the source of radar pulses. Then in accordance with the known radar equation, and for the case of a monostatic instance, this power at the output of the receiving antenna is given.

$$dp(t) = \frac{ps\left(t - \frac{2R}{c_o}\right) \cdot G^2 \cdot \lambda_0^2}{(4\pi)^3 \cdot R^4} G^0 dA$$

Wherein $ps(t-2R/c_o)$ equals the transmission power attenuated in accordance with a two-fold transit time $R/c_o$ between a transmitter-receiver on one hand, and a target on the other hand.

G is the antenna gain; the average wavelength of the radar signal; $c_o$ is the speed of light, and is the power of reflectivity of the target.

The total power available at the receiver input is the integral over all reflected power increments of the target area. The known radar equation thus links the input power of a radar receiver with the transmission of the radar device under utilization of the propagation path and the target. The relationship is of course understood to be in dependence upon time. A concurrent explication of the frequency information contained in the signals, particularly here the instantaneous Doppler frequency shift, and, for example, frequency modulated transmittal signals, is generally impossible.

This desired information can be acquired, however, if amplitude and phase information are processed simultaneously. Methods along that line are quite expensive and work quite slowly. Moreover, in order to make such a method work, it is necessary in addition to generate statistically relevant sets of data under utilization of random programs, for example, the so-called Monte Carlo method. These methods are very time consuming, and require extensive computer capacity and computer speeds.

DESCRIPTION OF THE INVENTION

It is an object of the present invention to provide a new and improved method for simulating a radar receiver wherein all frequency specific properties can be modeled, including, for example, the entire transmitter spectrum, the doppler shift, the effect of filters in the receiver, and others, whereby in particular a significantly shorter computer running time is required as compared with the known method, and whereby furthermore investigations are feasible about the back scatter capability of aerial targets.

It is therefore a specific object of the present invention to provide a new and improved computer-aided simulation of complete radar systems for purposes of evaluating instantaneous power and frequency information.

In accordance with the preferred embodiment of the present invention, it is suggested to use as a radar pulse simulating signal, a signal representing the instantaneous power spectrum of the transmitter; this signal is, first, modified in correspondence to the propagation and spreading path between transmitter and target, it is further modified in correspondence upon specific properties of the target as it affects reflection; the thus modified signal is further modified corresponding to specific properties of the receiver, and finally the signal as modified thus far is modified in accordance with specific properties of signal processing components in the receiver. The statistic moments of the first and second order of the signal as modified thus far are calculated and indicated.

Specifically, it is suggested that as far as the receiver is concerned, the amplification, filter and mixing properties in the receiver are simulated in the model. Further, component simulation involves a doppler compensating stage, and an analog-to-digital converter whereby specifically the simulation involves modifying the signal through assumed amplitude and phase statistics. The signal in the analog-to-digital converter is reduced in power through amplitude limitation, and an additional noise component is inserted to increase its instantaneous variance.

The statistic moments mentioned above include the expected value of the instantaneous power and the instantaneous variance associated therewith. Herein specifically the accumulated energy is to be calculated. It can thus be seen that the inventive method in fact extends the instantaneous power of the radar equipment as such to the instantaneous power spectrum as a function of time and frequency so that all frequency specific properties of a radar receiver to be simulated is in fact fully available for utilization by the model without having to resort to complex and extensive processing of amplitude and phase information in order to provide, for example, Monte Carlo simulation. The statistical properties of radar targets, such as point or aerial targets, can be represented by relevant statistical moments at the receiver output side. In the most simple case, these moments are the expected or anticipated value of power and the variance associated therewith. The respective statistic properties include all frequency specific transmission characteristics in relation to the instantaneous power spectrum as transformed in the receiver and in further relation to either an assumed or somehow given target statistics. For this reason, the otherwise necessary generation of statistically relevant condition and data sets through the Monte Carlo method can be dispensed with. This in turn permits a reduction in running time of the radar simulating program in the order of two to three orders of magnitude to the power 10. Moreover, the utilization of the thus generalized echo generation permits detailed investigations about the cross-correlation of back scatter capability of aerial targets under untilization, particularly of the instantaneous power spectrum. This way it is possible to link radar back scatter capability and physical properties of the target in an automated fashion. This is, for example, beneficial for improving models about the back scatter capability of ocean surfaces as they are, for example, investigated with a scatteral meter system of the earth research satellite ERS.

With reference to the receiver output, such as a video plane, it can be said that the utilization of the instantaneous power spectrum is an alternative to the concept of an ambiguity function used in radar engineering for purposes of providing cross-correlations between temporal functions of the transmitter and the receiver signal because the instantaneous power spectrum, just as the ambiguity function, permits access to range ambiguities as well as doppler ambiguities; there being, however, an important difference, namely, the instantaneous power spectrum can be transformed through all stages of the radar receiver simulation so that any ambiguities induced or caused by the receiver in addition can be considered accordingly, and that in turn permits simulator-aided optimization not only ultimately of the transmitter signal, but of the entire radar system.

In addition, the instantaneous power spectrum is linked with the instantaneous auto-correlation function through a Fourier transformation which permits enhancement of correlations of the radar target signature by means of simulation of and for the receiver system. This, in turn, establishes a physically meaningful simulation capability for the receiver-caused effect upon the spatial resolution capability of a radar system.

Since the usually required simulation of statistical target parameters can be omitted, the advantage is present that the computer running time is drastically reduced, which, in turn, opens up the possibility to simulate even complex radar system with all corner parameters, and still using only a reasonable amount of computer time. Moreover, additional data can be extracted through the resolution capability.

The inventive radar simulation method provides as an output the statistical moments of the process signal. Herein, the first statistical moment is the expectancy value $<p(t)>$ of the instantaneous power, and is provided as an average value of a set. In addition, there is the respectively associated instantaneous variance $\sigma$ of the aforementioned expectancy value. These moments are, for example, linked by means of a gaussian statistic for the probability density distribution of the amplitudes. The relation is given by $$p_g(a(t)) = \frac{1}{G_g(t) \cdot \sqrt{2\pi}} e^{-\frac{a^2(t)}{2 \cdot G_g^2(t)}}$$

wherein $p_g(a(t))$ is the gaussian probability density; $a(t)$ is the instantaneous amplitude of a stochastic process, and $\sigma_g$ equals $$G_g(t) = <p(t)> = 2 \int_0^\infty w(t,f) df$$

which is the instantaeous variance of the gaussian distribution defined through the frequency integral of the instantaneous power spectrum $w(t,f)$ as function of time $t$ and frequency $f$.

DESCRIPTION OF THE DRAWING

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

The FIGURE illustrates somewhat schematically a flow chart of a radar simulation method in accordance with the preferred embodiment of the present invention for practicing the best mode thereof, but can also be interpreted as a block diagram of a radar simulator.

Proceeding to the detailed description of the drawings, the FIGURE shows a transmitter or simulation device S, which of course can be understood to constitute a program portion within a computer, but is of course hypothetically conceivable as a model, i.e., a piece of hardware. This transmitter simulator cooperates with a target simulator receiver E, an analog-to-digital converter ADC, and an evaluating and processing stage A. Not shown is a squaring stage Q, as it is customary for radar and actually a prerequisite for equipment of the type to which the invention pertains.

The radar simulator will have prescribed the transmitter signal to be simulated in accordance with a particular amplitude and phase. The transmitter simulator produces a signal which is the instantaneous power spectrum $w_s(t,f)$, being accordingly dependent upon frequency and time. This signal will be modified in the target simulator Z under consideration of a geometric factor such as the assumed distance R, the angle $\phi$ and/or the elevation H. Moreover, further available parameters are the target property $\sigma°$, the propagation and spreading losses $L_a$, and the antenna gain G in accordance with a generalized radar equation, so as to produce the receiver input signal $w_{in}(t,f)$.

The receiver simulator E will modify this signal as modified thus far in accordance with the known operating characteristics of the basic receiver components such as a filter having characteristic $H_E(t)$, the mixer $L_m$, the amplifier $G_v$, so as to produce a signal $w_{out}(t,f)$. In an analog-to-digital converter ADC, the signal is modified again, whereby it is particularly attenuated in accordance with a power reduction factor F(t), and noise is added in accordance with the noise power components $r_{ADC}$. The final stage, which is the evaluating stage A, forms the expectancy value $<p(t)>$, and the accumulated energy E(t), and the variance $\sigma^2(E(t))$, and these values are then indicated.

The simulation method as described generally thus far can be analytically presented in mathematical notation as a formation of the accumulated energy available at the radar output and within the measuring period T. This energy E(t) at the time t is given by $$E(t) = \int_{t-T}^{t} <p(t')> dt'$$

wherein $$p(t) = 2 \cdot F(t) \int_{f=0}^{\infty} \text{receiver}\{w_{in}(t,f)\} df + r_{ADC}(t) + r_n(t)$$

Herein, F(t) is the aforementioned power reduction factor not larger than 1, as a result of the amplitude limitation during the analog-to-digital conversion; $r_{ADC}(t)$ is the noise component as a result of finite step quantization; $r_n(t)$ represents the combination of receiver and background noise power; $w_{in}(t,f)$ is the instantaneous power spectrum at the output of the receiver antenna defined as the radar equation having been generalized towards instantaneous power spectra.

$$w_{in}(t,f) =$$

$$\frac{\lambda_0^2}{4\pi^3} \int_{\phi=0}^{2T} \int_{R_1 = \frac{c_0(t-\tau)}{2}}^{R_2 = \frac{c_0 t}{2}} \frac{G^2(R,\phi)G^0(R,\phi\ldots)}{R^4 \cdot L_a(R,\phi\ldots)} \cdot$$

$$w_s\left(t - \frac{2R}{c_0}, f - f_D(R,\dot{R},\phi)\right) \cdot \frac{R_e}{R_e + H} \cdot R \cdot dR \cdot d\phi$$

herein $\lambda$ is the wavelength of the carrier frequency as defined by and in the transmitter. $RdRd\phi = dA$ is the aerial element of the effectively back scattering target area. R is the distance between this target area and the radar system; $\dot{R}$ is the time derivative of that distance. $\phi$ is the azimuthal angle, $\tau$ is the period of duration of the entire transmitter signal, $c_o$ is the speed of light. And $G(R,\phi)$ is the gain of transmitter and/or receiver antenna with reference to the power level given as a function of the integration coordinates R and $\sigma^\circ$ is the power reflectivity of the target area wherein the points realize dependency other than mere integretation limits. $L_a$ are the spreading and propagation losses resulting for example through the atmosphere itself, fog, rain, snow and the like. $R_e$ is the local radius of curvature of the earth as a function of the position of the radar system. H is the local elevation of the radar system above the surface of the earth. $f_D$ is the instantaneous Doppler effect frequency shift as a function of the integration limits and of the time derivative of distance. $2R/c_O$ is the retardation as a result of the roundtrip time of the radar signal. $W_s(t,f)$ is the instantaneous power spectrum as generated by the transmitter and transmitted by the antenna.

The particular quantity receiver { } is defined as an operator for establishing the effectiveness of all receiver components such as the filter $H_e(f)$, the mixer $L_m$ and the amplifier $G_v$ which can be demonstrated in accordance with the following example whereby it is assumed that mixing occurs downstream in the stated sequence.

$$W_{out}(t,f) = \text{receiver } \{W_{im}(t,f)\}$$

-continued
$$= G_v \cdot L_m \cdot |H_E(f)|^2 \cdot W_{im}(t, f - f_{Lo}(t))$$

herein $v$, $L_m$ and $H_e(f)$ are respectively the power amplification of the amplifier stage in the receiver; the conversion losses in the mixer; and the operative transfer function of the filter in the receiver. $F_{Lo}$ is the frequency of the local oscillator feeding the mixer. The associated variance can be calculated in accordance with the instantaneous auto correlation function $$\psi(t,z) = \int_{f=-\infty}^{+\infty} w_{digital}(t,f) \cdot e^{-i2\pi f^2} df$$

which include the variance increase through the ADC process:

$$\sigma_{ADC}^2 + \frac{(\Delta U)^4}{180} \; ; \; \Delta U = \frac{2U_o}{2^{n_B}}$$

wherein $2U_o$ is a quantizing window; and $n_B$ is the number of bits used in the quantization process. This then yields $$G_{E(t)}^2 = \frac{2}{n^2} \sum_{\mu=1}^{n} \sum_{v=1}^{n} (\psi(t_v, |t_v - t_\mu|) \cdot$$

$$\{2s(t_v) \cdot s(t_\mu) + \psi(t_v, |t_v - t_\mu|)\})$$

herein it can be agreed that measuring period T equals $n \cdot \alpha t$ and $\Delta t$ is the period in between two scanning values. $\psi(t,z)$ is the instantaneous auto correlation function, and s(t) is the deterministic signal amplitude in the case of a mixed process.

The invention is not limited to the embodiments described above, but all changes and modifications thereof, not constituting departures from the spirit and scope of the invention are intended to be included.

I claim:

1. Method for computer aided simulation of complete radar systems under evaluation of the instantaneous power and frequency information of such systems, comprising the steps of:
   using a simulator signal representing the instantaneous time and frequency variable power spectrum of the transmitter of a radar system to be simulated;
   modifying said simulator signal in accordance with an expected propagation and spreading path, said path also to be simulated, and, in addition modifying said simulator signal in accordance with expected preselected target properties to be simulated accordingly;
   modifying the previously modified signal in accordance with particular properties characteristical of the receiver of the radar system to be simulated;
   modifying the signal as modified in accordance with the preceeding receiver simulating step, including digitization and under utilization of the characteristics of signal processing components connected to the receiver and to be simulated accordingly; and
   calculating statistical moments of the first and second order of the resulting signal and indicating the same.

2. Method in accordance with claim 1, wherein the simulated properties of the receiver in accordance with one of steps includes amplification characteristics, filter characteristics and mixing characteristics.

3. Method as in claim 1, wherein the simulated component in accordance with the penultimate step, includes simulation of a Doppler compensator stage as well as an analog-to-digital converter, whereby the signal is modified in accordance with assumed or preselected amplitude and phase statistics.

4. Method as in claim 1, wherein the simulation includes consideration of the amplitude limitation in an analog to digital converter corresponding to power reduction, the step further including the adding of noise for increasing the instantaneous variance of the simulated converter.

5. Method as in claim 1, wherein said statistic moments to be calculated are the expectancy of the instantaneous power and the respectively associated instantaneous variance.

6. Method as in claim 5, and including the step of calculating and simulating the accumulated energy.

* * * * *